US009218896B2

(12) United States Patent
Smith et al.

(10) Patent No.: US 9,218,896 B2
(45) Date of Patent: Dec. 22, 2015

(54) NARROW ANNULUS PERMANENT CANAL SEAL PLATE

(71) Applicant: AREVA NP Inc., Lynchburg, VA (US)

(72) Inventors: Andrew Carl Smith, Huddleston, VA (US); Thomas Newland Busic, Lynchburg, VA (US); Ryan Michael Welsh, Lynchburg, VA (US)

(73) Assignee: AREVA Inc., Lynchburg, VA (US)

( * ) Notice: Subject to any disclaimer, the term of this patent is extended or adjusted under 35 U.S.C. 154(b) by 412 days.

(21) Appl. No.: 13/935,669

(22) Filed: Jul. 5, 2013

(65) Prior Publication Data
US 2014/0247914 A1 Sep. 4, 2014

Related U.S. Application Data

(60) Provisional application No. 61/772,171, filed on Mar. 4, 2013.

(51) Int. Cl.
G21C 13/028 (2006.01)
G21C 13/073 (2006.01)

(52) U.S. Cl.
CPC .......... *G21C 13/028* (2013.01); *G21C 13/0735* (2013.01); *Y02E 30/40* (2013.01)

(58) Field of Classification Search
CPC ................. G21C 13/028; G21C 13/0735
USPC ..................... 376/203, 204, 205; 277/634
See application file for complete search history.

(56) References Cited

U.S. PATENT DOCUMENTS

| 4,170,517 | A | | 10/1979 | Meuschke et al. |
| 4,747,993 | A | | 5/1988 | Hankinson et al. |
| 4,758,402 | A | * | 7/1988 | Schukei ............... G21C 13/028 376/203 |
| 4,904,442 | A | | 2/1990 | Swidwa et al. |
| 4,905,260 | A | | 2/1990 | Swidwa et al. |
| 5,102,612 | A | | 4/1992 | McDonald et al. |
| 5,230,860 | A | | 7/1993 | Behnke et al. |
| 5,272,732 | A | | 12/1993 | Chiang |
| 5,359,632 | A | | 10/1994 | Bottoms et al. |
| 5,434,894 | A | | 7/1995 | Chiang et al. |
| 6,317,477 | B1 | * | 11/2001 | Matteson ............. G21C 13/028 376/203 |
| 7,813,464 | B1 | | 10/2010 | Harkness |

* cited by examiner

*Primary Examiner* — Jack W Keith
*Assistant Examiner* — Daniel Wasil
(74) *Attorney, Agent, or Firm* — Sean P. O'Hanlon, Esq., PLLC

(57) ABSTRACT

A permanent seal for a refueling canal of a nuclear power plant. The seal includes a support structure and a membrane. The support structure includes a first annular plate with ribs connected to and extending from a lower surface of the annular plate. The support structure is positioned atop the shield wall on the refueling canal floor, encircling and positioned near the annulus. The membrane includes a first end that is connected to the seal ledge and a second end that is connected to the refueling canal floor. The membrane has a stepped profile, with side walls extending substantially perpendicularly from a central annular plate to form a pocket configured to fit over the support structure. Loads imparted to the membrane are transferred through the support structure annular plate and ribs to the refueling canal floor.

8 Claims, 2 Drawing Sheets

NARROW ANNULUS PERMANENT CANAL SEAL PLATE

CROSS-REFERENCE TO RELATED APPLICATIONS

This patent application claims the benefit of U.S. Provisional Patent Application No. 61/772,171 filed on Mar. 4, 2013, which is incorporated herein by reference in its entirety.

BACKGROUND OF THE INVENTION

1. Field of the Invention

The present invention relates to a mechanical seal, and, more particularly, the present invention relates to a seal for a refueling canal of a nuclear power plant.

2. Description of the Related Art

While the present invention may be used in a variety of industries, the environment of a pressurized water reactor (PWR) nuclear power plant will be discussed herein for illustrative purposes. A typical pressurized water reactor is a cylindrical steel vessel with a hemispherical head on each end of the cylinder. The reactor holds the fuel and system components used to generate electricity then the reactor is on-line. One of the hemispherical closure heads can be removed for the purposes of refueling the reactor and performing maintenance within the reactor vessel. A peripheral flange is located near the joint between the reactor vessel and the removable closure head. This flange extends radially outward from the vessel centerline and is referred to herein as the "seal ledge."

The reactor vessel is positioned within a shield wall forming an annulus between the seal ledge and the shield wall. The top of the seal ledge and shield wall form the base of the refueling canal, which is used to transport spent fuel from the reactor to a storage facility. At the top of the shield wall and refuel canal floor juncture there is a piece of embedded steel to which a canal floor liner is attached. The embedded steel, as part of the shield wall, forms the outer boundary of the annulus. Some nuclear plants have a wide annulus that may be two to three feet wide, while others have a smaller annulus that is as little as two to four inches wide.

Under normal operating conditions the annulus allows the reactor vessel to move in the vertical and horizontal directions, as well as allowing airflow around the reactor vessel. During refueling activities the annulus is sealed so the refueling canal can be flooded with water to reduce radiation levels. During reactor operation, however, the refueling canal is kept dry.

If air cannot flow around the vessel when the reactor is operating, then damage could occur to the nuclear instrumentation used for monitoring the core, the shield wall, and the reactor vessel supports. If the annulus cannot be fully sealed during refueling, then the refueling canal would drain down and refueling water would contact the outside of the reactor vessel. Refueling water must be cleaned from the outside surface of the vessel because such water contains boric acid, which is corrosive to the vessel base material. This vessel cleaning is costly and incurs radiation dose exposure, both of which are preventable.

One known attempt to seal the annulus to prevent leakage through the refueling canal uses a device that compresses an elastomer seal. These devices must be installed prior to refueling and then removed after refueling before the reactor operation cycle can begin. Additionally, these seals need to be inspected and replaced to ensure reliability. The inspections, installation, and removals are costly and incur plant personnel radiation exposure.

Other known attempts to seal the annulus use permanent reactor cavity annulus seals. These devices can be broken into several categories; some bear structural members on the shield wall and the seal ledge, others bear the structural members on beams extending into the annulus, while still other devices cantilever structural members over the annulus. All of these devices provide a permanent membrane that has a welded connection to the seal ledge and the shield wall.

One known attempt uses an annulus sealing device that is supported by beams that extend from the shield wall towards the reactor vessel, but do not contact the vessel. There is a U-shaped sealing feature that extends below the plane of the sealing flange. However, it is not possible to support this type of device in an annulus without support beams.

Other known attempts use annulus sealing devices that bear structural members on the seal ledge and the shield wall. However, these devices cannot be used in locations where it is not feasible to bear structural members on both the seal ledge and shield wall.

One known attempt uses a device that cantilevers over the annulus with the support structure either anchored on the shield wall or the seal ledge. The support structure forms part of the sealing membrane, and the membrane's flexibility is gained from a C-shaped flexure. However, the C-shaped flexure creates a side pocket that will be difficult to decontaminate after the refueling canal has been drained.

Thus, what is needed is a better way to seal the refueling canal.

SUMMARY OF THE INVENTION

The present invention is an improved permanent seal for a refueling canal of a nuclear power plant. The seal includes a support structure and a membrane. The support structure includes a first annular plate with a number of ribs connected to and extending from a lower surface of the support structure annular plate. The support structure is positioned atop the shield wall on the refueling canal floor, encircling and positioned near the annulus. Some or all of the ribs are connected to the canal floor at their distal ends. The ribs can be positioned symmetrically about the support structure annular plate, at least in part.

The membrane includes a first end that is connected to the seal ledge and a second end that is connected to the refueling canal floor. The membrane has a stepped profile, with side walls extending substantially perpendicularly from a central annular plate. The membrane is formed of a flexible material, such as stainless steel, to accommodate for thermal expansion and contraction of the membrane as well as the plant components to which the membrane is connected. The membrane side walls and annular plate form a pocket, which is configured to fit over the support structure. The membrane has a greater radial length than does the support structure, and thus completely overlies the support structure. Thus, only the membrane is in contact with the refueling liquid during the refueling process.

In use, the support structure is assembled and affixed in the desired position. The membrane is assembled and affixed in the desired position with a lower surface of the membrane annular plate adjacent to an upper surface of the support structure annular plate. Loads imparted by the refueling water and equipment used during the refueling outage that are placed atop the membrane are imparted through the support structure annular plate and ribs to the refueling canal floor.

The membrane annular plate may contain resealable port openings to allow for access to various plant components and instrumentation, and for ventilation flow. The support structure annular plate would then contain holes that are aligned with the port openings.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

Figure 1:
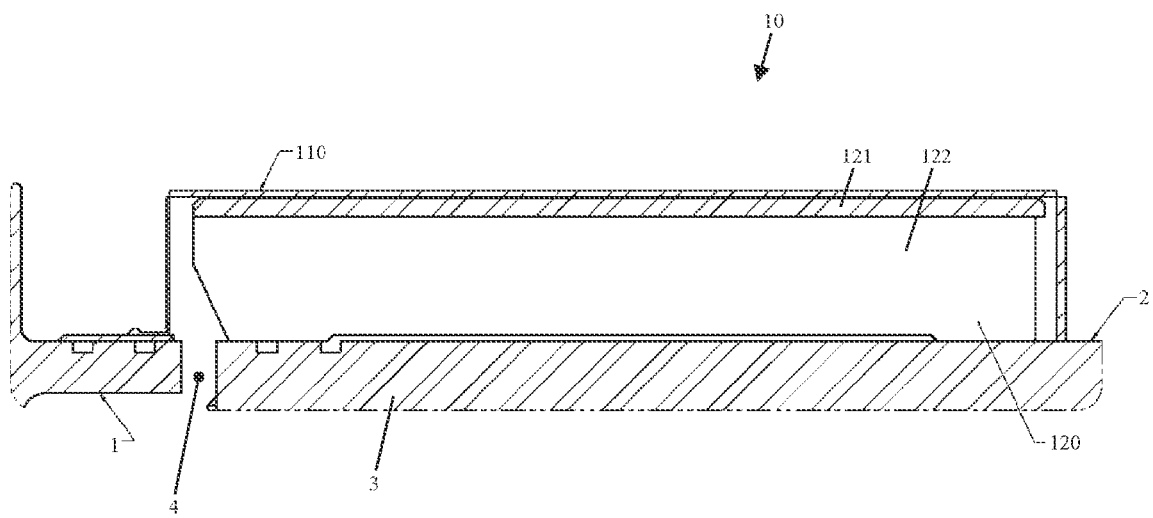
FIG. 1 shows a cross-sectional view through a narrow annulus permanent canal seal plate of the present invention.

The present invention is a permanent seal for a refueling canal of a nuclear power plant; the present invention provides a liquid barrier over the annular space between a nuclear reactor vessel flange (seal ledge) and the surrounding annular ledge (shield wall). FIG. 1 shows a narrow annulus permanent canal seal plate 10 of the present invention. FIG. 1 shows the seal plate 10 in its use environment of a nuclear power plant and illustrates components thereof, including the seal ledge 1, the refueling canal floor 2, the shield wall 3, and the annulus 4. The seal plate 10 is an annulus sealing device that is comprised of two major subassemblies: a flexible membrane 110 and a support structure 120.

Figure 2:
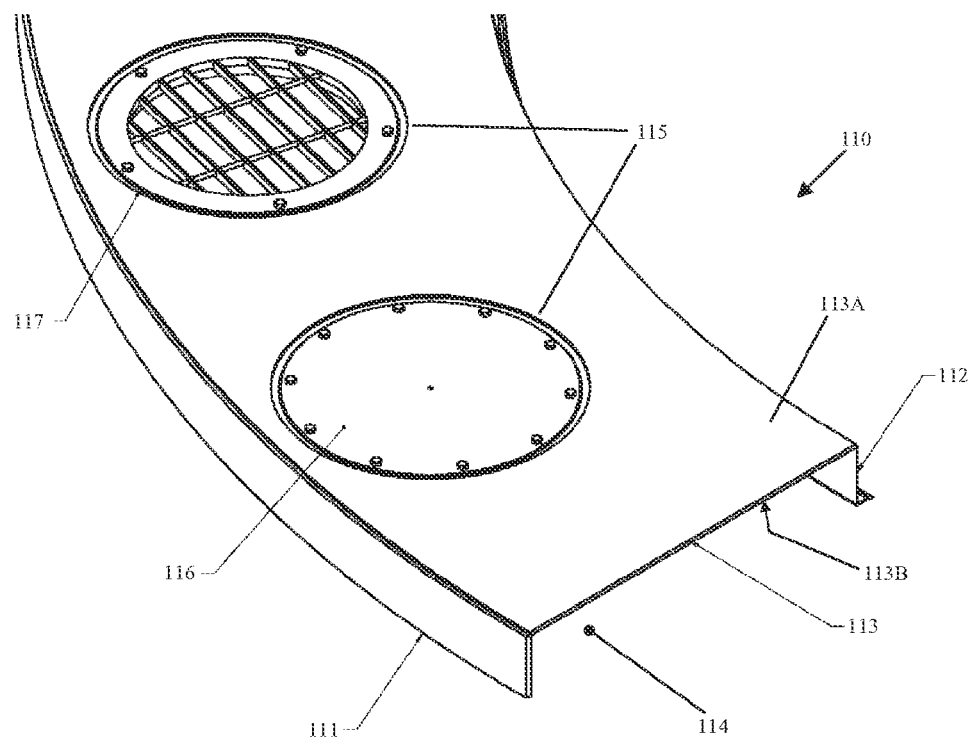
FIG. 2 shows a partial perspective view of the membrane component of the seal plate of FIG. 1.

The flexible membrane 110 is a peripheral plate that is coupled to the seal ledge 1 and the refueling canal floor. As shown in FIG. 2, the membrane 110 is configured to cover the annulus, having an outer cylindrical wall 111 coupled to the refueling canal floor 1 and an inner cylindrical wall 112 coupled to the seal ledge 1. One preferred method of coupling the membrane 110 to the plant components 1, 2 is by welding. Preferably, the entireties of the inner and outer circumferential walls 112, 111 of the membrane 110 are welded to the plant components 1, 2. In this manner, water-tight integrity of the seal 10 is ensured.

As further illustrated in FIG. 2, the membrane 110 further includes an annular plate 113 connecting the inner and outer diameter walls 112, 111, which are angled relative the plate 113 to define a pocket 114 therewith. The annular top plate 113 includes an upper surface 113A and a lower surface 113B.

Access port openings 115 are provided in the membrane 110 to allow for access to the reactor vessel nozzles and the nuclear instrumentation that surrounds the reactor vessel. Thus, the present invention does not impair the ability to access, inspect, repair, or replace components of the nuclear plant. During refueling activities, the port openings can be closed via covers 116 that are bolted thereto to provide a water tight seal that will withstand the flooded canal water load. The port covers 116 can be sealed with replaceable O-rings to ensure that they are water-tight. During reactor operation, the port covers 116 are removed and ventilated covers 117 can be installed to allow for HVAC airflow. While the size of the port openings 115 can vary, a diameter of approximately 19 to 20 inches is preferred. Likewise, the number of openings 115 can vary. In one preferred embodiment, the port openings 115 are symmetrically positioned is about the membrane 110 with approximately 15 to 25 inches between adjacent openings 115.

The membrane 110 preferably is formed of a flexible material, one example being stainless steel. This flexibility allows for the expansion and contraction the seal plate 10 and plant components will be subjected to due to the temperature fluctuations between the relatively cold environment during a refueling shutdown of the reactor and the relatively hot environment of the operating nuclear plant.

Figure 3:
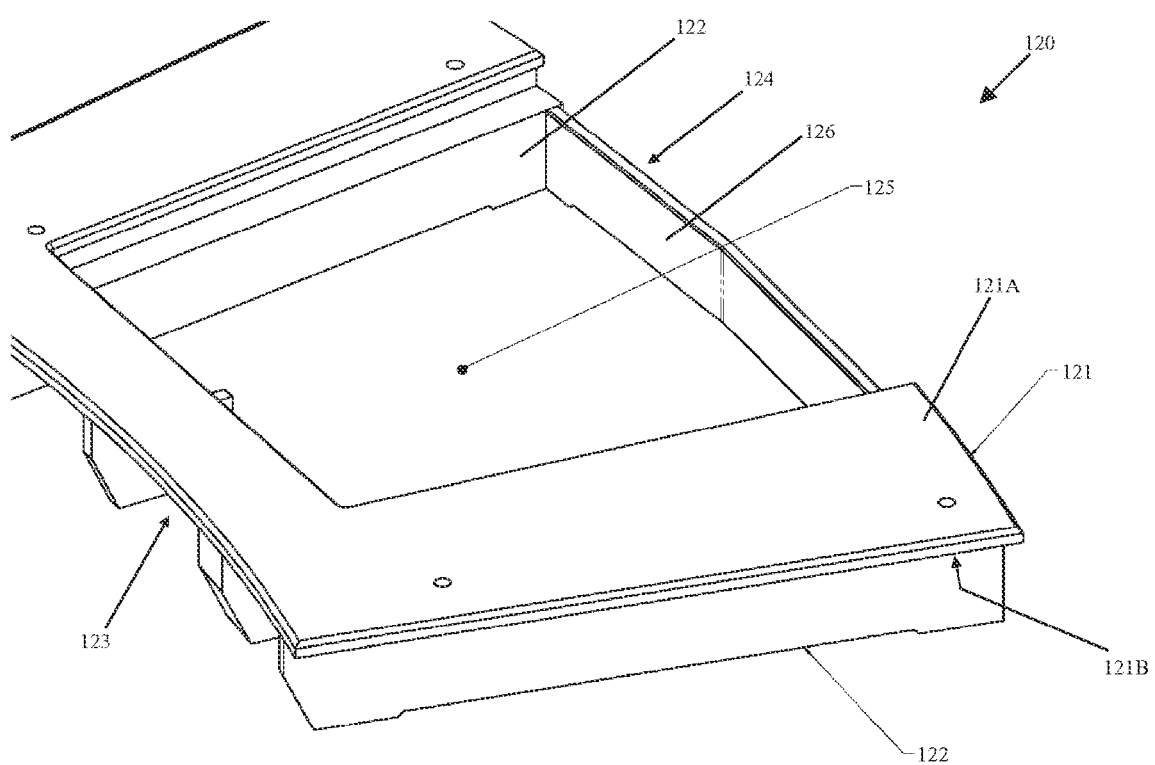
FIG. 3 shows a partial perspective view of the structural support component of the seal plate of FIG. 1.

FIG. 3 illustrates the support structure 120, which is provided underneath the flexible membrane 110 within the membrane pocket 114. The support structure 120 includes a horizontal annular plate 121 having an upper surface 121A and a lower surface 121B. A plurality of ribs 122 are coupled to and extend substantially perpendicularly from the lower surface 121B. Proximal ends of the ribs 122 may be coupled to the lower surface 121B in a variety of manners, such as by welding. In use, the support 120 is positioned atop the refueling canal floor 2 (see FIG. 1). Distal ends of the ribs 122 are in contact with the canal floor 2, with select ones of the ribs 122 being coupled, such as by welding, to the canal floor 2. The ribs extend radially from an inner diameter side 123 of the support structure 120 to an outer diameter side 124 of the support structure 120. Preferably, the ribs 122 are positioned radially with respect to the membrane annular plate 121 and/or center of the reactor vessel. Gaps between the ribs 122 allow for HVAC flow from the annulus 4 to the access port 115 locations. The number of ribs 122 may vary. Preferably, the ribs 122 are positioned symmetrically about the support plate 121, such as at a spacing of one rib 122 per every 5° to 15°, with one rib 122 per every approximately 10° being more preferred.

The support plate 122 defines a number of holes 125 therethrough. The holes 125 are positioned such that they are aligned with the access ports 115 of the membrane 110. Portions of the ribs 122 underlying the holes 125 may be removed. Thus, the support 120 does not interfere with the access provided by the ports 125. A back wall 126 may be provided to connect adjacent ribs 122 and provide support for the support structure 120 around the holes 125.

In use, the support structure 120 is assembled in known manner. This may include forming a number of arc sections of the support plate 121 that are eventually assembled, such as by welding, to form a complete 360° ring to fit completely around the annulus 4. The ribs 122 are attached, such as by welding, to the lower surface 121B of the support plate 121. The arc sections are then positioned atop the refueling canal floor 2 and affixed thereto. Adjacent arc sections may or may not be coupled together.

The flexible membrane 110 is likewise assembled in known manner. This may also include forming a number of arc sections that are eventually assembled, such as by welding, to form a complete 360° ring to fit completely over the annulus 4. Each arc section may include a top plate 113 to which the inner and outer walls 112, 111 are coupled. Alternatively, the top plate 113 and walls 111, 112 may be a single integral piece, with the walls 111, 112 being formed by plastically deforming end portions of the top plate 112. Preferably, the walls 111, 112 are substantially perpendicular to the top plate 113.

Once formed, the membrane 110 is positioned such that its inner cylindrical wall 112 is atop the seal ledge 1 and its outer cylindrical wall 111 is atop the refueling canal floor. The membrane pocket 114 is positioned over the support structure 120 such that the lower surface 113B of the membrane annular plate 113 rests atop the upper surface 121A of the support structure annular plate 121. The membrane 110 is positioned such that the port openings 115 overlie the support plate holes 125. Any arc sections of the membrane are coupled together, such as by welding. The membrane 110 and the support structure 120 need not be coupled together. As shown, for example, in FIG. 1, both the membrane 110 and the support structure 120 have radial lengths. FIG. 1 shows a cross-sectional view through the seal 10 and plant components, the radial lengths of the membrane 110 and the support structure 120 being in the plane of the figure. The membrane 110 radial length is greater than the support structure 120 radial length, such that the membrane annular plate lower surface 113B completely overlies the support structure annular plate upper surface 121A and extends beyond radial ends thereof. Thus, the membrane outer diameter wall 111 is coupled to the canal floor 2 along a circumference that completely encircles the support structure 120.

Prior to a refueling of the reactor, the refueling canal is flooded with refueling water to a depth of 26 feet or more. The weight of this water exerts a force on the membrane 110. Equipment used in the refueling process is also placed within the canal 2 atop the membrane 110. The weight load of this water and equipment is transferred from the membrane 110, to the support plate 121 and ribs 122 to the refueling canal floor 2. Thus, the structure 120 supports the membrane 110, helping to ensure its structural integrity.

Stainless steel is a preferred material for both the flexible member 110 and the support structure 120. In addition to having flexibility to withstand the compression and tension loads imparted by thermal expansion, stainless steel can also withstand the chemical conditions of the refueling processes.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A permanent seal for providing a liquid barrier over an annular space between a nuclear reactor vessel seal ledge and a surrounding annular ledge, comprising:

a support structure including an annular plate having a first surface and a second surface and a plurality of ribs coupled to said support structure annular plate second surface at first ends thereof and to the annular ledge at second ends thereof; and a membrane having a first end coupled to the vessel seal ledge, a second end coupled to the annular ledge, and an annular plate extending between said membrane first and second ends, said membrane annular plate having a first surface and a second surface;

wherein said support structure and said membrane are positioned such that said membrane annular plate second surface is adjacent said support structure annular plate first surface.

2. The permanent seal of claim 1, wherein:

said support structure annular plate has a first radial length;

said membrane annular plate has a second radial length; and said second radial length is greater than said first radial length such that said membrane annular plate second surface completely overlies said support structure annular plate first surface and extends beyond radial ends thereof.

3. The permanent seal of claim 1, wherein at least a portion of said ribs are positioned substantially symmetrically about said support structure.

4. The permanent seal of claim 3, wherein said ribs within said portion are positioned at substantially regular intervals about said structure, said intervals being from 5° to 15°.

5. The permanent seal of claim 1, wherein said support structure ribs have longitudinal axes and said support structure ribs are coupled to said support structure annular plate such that said longitudinal axes are arranged substantially radially with respect to said support structure annular plate.

6. The permanent seal of claim 1, wherein said membrane second end is coupled to the annular ledge along a first circumference that completely encircles said support structure.

7. The permanent seal of claim 1, wherein said support structure further includes a second plurality of ribs coupled to said annular plate second surface at first ends thereof and positioned adjacent to the annular ledge at second ends thereof without being coupled to the annular ledge.

8. The permanent seal of claim 1, wherein:

said membrane annular plate defines a plurality of resealable port openings therethrough;

said support structure annular plate defines a plurality of holes therethrough; and said port openings and said holes being substantially aligned.

* * * * *